US009619554B2

(12) United States Patent
Liu et al.

(10) Patent No.: US 9,619,554 B2
(45) Date of Patent: Apr. 11, 2017

(54) DOMAIN SPECIFIC QUERY-COMPLETION SUGGESTIONS

(75) Inventors: Xin Liu, Sammamish, WA (US); Nitin Agrawal, Redmond, WA (US); James Francis Gilsinan, IV, Redmond, WA (US); James B. Lawson, Kenmore, WA (US); Brian Whalen MacDonald, Bellevue, WA (US); Mairéad Áine O'Donovan, Seattle, WA (US); Kimberly M. Vlcek, Redmond, WA (US); Nipoon Malhotra, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 198 days.

(21) Appl. No.: 13/288,593

(22) Filed: Nov. 3, 2011

(65) Prior Publication Data
US 2013/0117297 A1 May 9, 2013

(51) Int. Cl.
*G06F 17/00* (2006.01)
*G06F 17/30* (2006.01)

(52) U.S. Cl.
CPC ............................. *G06F 17/3064* (2013.01)

(58) Field of Classification Search
CPC ........... G06F 17/30867; G06F 17/3097; G06F 17/3064; G06F 17/30864; G06F 17/30672; G06F 17/30967
USPC ....................................................... 707/767
See application file for complete search history.

(56) References Cited

U.S. PATENT DOCUMENTS

| 7,487,144 | B2 | 2/2009 | Shakib et al. |
| 7,693,830 | B2 | 4/2010 | Guha |
| 7,844,599 | B2 | 11/2010 | Kasperski et al. |
| 7,895,206 | B2 | 2/2011 | Narayanan et al. |
| 8,010,537 | B2 * | 8/2011 | Kantamneni et al. ........ 707/748 |
| 2008/0104037 | A1 * | 5/2008 | Bierner ............................. 707/3 |

(Continued)

OTHER PUBLICATIONS

Arguello, et al., "Sources of Evidence for Vertical Selection", In proceedings of the 32nd international ACM SIGIR conference on research and development in information retrieval, Jul. 19-23, 2009, 8 pages.

(Continued)

*Primary Examiner* — Ann J Lo
(74) *Attorney, Agent, or Firm* — Shook, Hardy & Bacon L.L.P.

(57) ABSTRACT

Systems, methods, and computer-readable storage media for providing query-completion suggestions configured to be searched against vertical information domains in response to receiving a general web search query are provided. At least a portion of a general web search query is received. As the portion of the general web search query is received, query-completion suggestions are determined as is a likely primary intent associated with at least a portion of the determined query-completion suggestions. If the likely primary intent associated with a particular query-completion suggestion is for information associated with a particular vertical information domain other than the general web domain, the query-completion suggestion is provided such that selection thereof causes searching of the query-completion suggestion against the particular information domain for search results.

17 Claims, 5 Drawing Sheets

(56) References Cited

U.S. PATENT DOCUMENTS

2010/0057698 A1    3/2010   Kantamneni et al.
2011/0093488 A1*  4/2011   Amacker .......... G06F 17/30873
                                                                     707/767

OTHER PUBLICATIONS

Wall, Aaron, "Yahoo! Search Now Powered by Bing", Retrieved on: Jun. 1, 2011, Available at: http://www.searchnewz.com/topstory/news/sn-2-20100819YahooSearchNowPoweredbyBing.html.
Johnson, Nathania, "Bing's Autosuggest Integrates Query History", Retrieved on: Jun. 1, 2011, Available at: http://searchenginewatch.com/article/2051139/Bings-Autosuggest-Integrates-Query-History.

* cited by examiner

DOMAIN SPECIFIC QUERY-COMPLETION SUGGESTIONS

BACKGROUND

The Internet, through its billions of Web pages, provides a vast and quickly growing library of information and resources. In order to find desired content, computer users often make use of search utilities. Exemplary Internet search engines are well known in the art, for instance, a commonly known commercial engine is the Bing® search engine provided by Microsoft Corporation of Redmond, Wash. In an attempt to ensure users are providing a query that will prove most useful in retrieving the results they desire, many search utilities offer query-completion suggestions as the user inputs a partial search query. Upon selection of a particular query-completion suggestion, the selected query-completion suggestion is searched against the general web search domain and results are provided to the user in the form of a search engine results page presented in association with the general web search domain (e.g., www.bing.com).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-readable storage media for, among other things, providing query-completion suggestions configured to be searched against vertical information domains in response to receiving a general web search query. A vertical information domain is a content site generally provided in association with a search engine that provides content and organization specific to a particular topic. For instance, vertical information domains may include, without limitation, shopping, videos, images, music, news and the like. The information accessible via a vertical information domain (that is, information indexed in association with a vertical information domain) often provides richer content than that accessible via, and indexed in association with, a general web domain. Thus, if it can be determined with reasonable certainty upon receipt of a query or partial query that a user desires information that is available from a vertical information domain, even though information is likely also available via the general web domain, searching the query against the vertical information domain is likely to result in richer more satisfying search results for the user.

At least a portion of a general web search query is received. The query portion may be received, for instance, via a query-input region or search box presented in association with a general web search domain (e.g., www.bing.com, www.google.com, or the like). As the portion of the general web search query is received, query-completion suggestions (that is, suggested complete queries determined based upon the query portion input) are determined as is a likely primary intent associated with at least a portion of the determined query-completion suggestions. Upon determining that the likely primary intent associated with a particular query-completion suggestion is for information associated with a particular vertical information domain other than the general web domain, the query-completion suggestion is provided such that selection thereof causes searching of the query-completion suggestion against the particular information domain for search results. Thus, upon user selection of the particular query completion suggestion, the user is navigated to the particular information domain and search results are provided that are indexed within the particular information domain rather than merely within the general web search domain.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
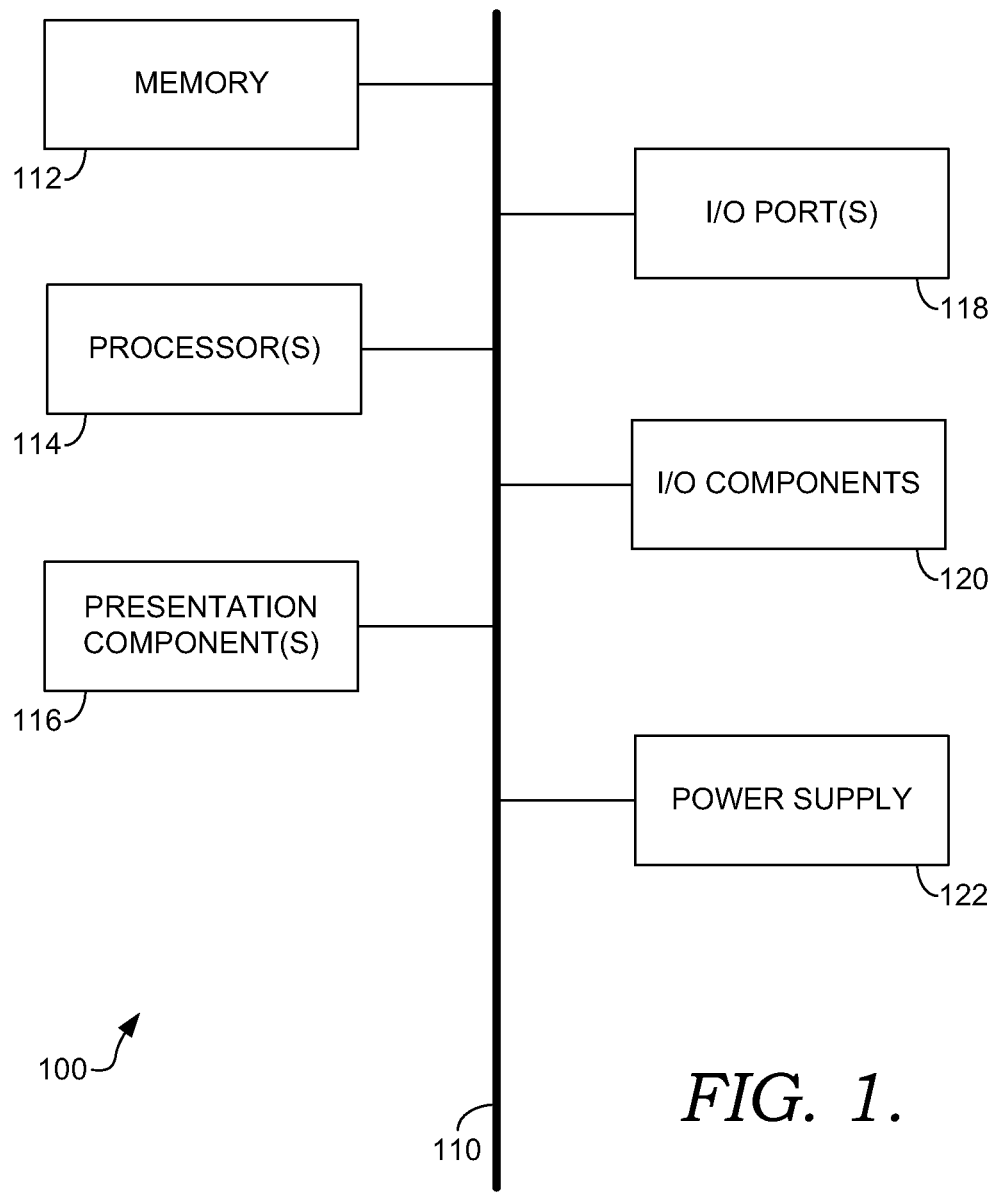
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for, among other things, providing query-completion suggestions configured to be searched against vertical information domains in response to receiving a general web search query. A vertical information domain is a content site generally provided in association with a search engine that provides content and organization specific to a particular topic. For instance, vertical information domains may include, without limitation, shopping, videos, images, music, news, and the like. The information accessible via a vertical information domain (that is, information indexed in association with a vertical information domain) often provides richer content than that accessible via, and indexed in association with, a general web domain. Thus, if it can be determined with reasonable certainty upon receipt of a query or partial query that a user desires information that is available from a vertical information domain, even though information is likely also available via the general web domain, searching the query against the vertical information domain is likely to result in richer more satisfying search results for the user.

In accordance with embodiments hereof, at least a portion of a general web search query is received. The query portion may be received, for instance, via a query-input region or search box presented in association with a general web search domain (e.g., www.bing.com, www.google.com, or the like). As the portion of the general web search query is received, query-completion suggestions (that is, suggested complete queries determined based upon the query portion input) are determined as is a likely primary intent associated with at least a portion of the determined query-completion suggestions. Upon determining that the likely primary intent associated with a particular query-completion suggestion is for information associated with a particular vertical information domain other than the general web domain, the query-completion suggestion is provided such that selection thereof causes searching of the query-completion suggestion against the particular information domain for search results. Thus, upon user selection of the particular query completion suggestion, the user is navigated to the particular information domain and search results are provided that are indexed within the particular information domain rather than merely within the general web search domain.

Accordingly, one embodiment of the present invention is directed to one or more computer-readable storage media storing computer-useable instructions that, when used by one or more computing devices, cause the one or more computing devices to perform a method. The method includes receiving a portion of a search query, determining one or more query-completion suggestions for the received search query portion, determining an intent of at least one of the one or more query-completion suggestions is for information associated with a particular information domain other than a general web domain, and providing the at least one of the one or more query-completion suggestions such that selection thereof causes searching of the at least one of the one or more query-completion suggestions against the particular information domain.

Another embodiment of the present invention is directed to a system comprising a processor in communication with computer-readable storage media, a receiving component, a query-completion suggestion component, and a determining component. The receiving component is configured to receive a portion of a search query. The query-completion suggestion component is configured to determine one or more query-completion suggestions for the received search query portion. The determining component is configured to determine the likelihood that an intent of at least one of the one or more query-completion suggestions is for information associated with a particular information domain other than a general web domain and to determine whether the determined likelihood exceeds a threshold value. Upon the determining component determining that the likelihood exceeds the threshold value, the query-completion suggestion component is further configured to access information stored in association with the computer-readable storage media and provide the at least one of the one or more query-completion suggestions such that selection thereof causes searching of the at least one of the one or more query-completion suggestions against the particular information domain.

In yet another embodiment, the present invention is directed to a method performed by a computing device having a processor. The method includes receiving a portion of a search query, determining one or more query-completion suggestions for the received query portion, determining a likelihood that an intent of at least one of the one or more query-completion suggestions is for information associated with a particular information domain other than a general web domain, and determining whether the determined likelihood exceeds a threshold value. Upon determining that the determined likelihood exceeds the threshold value, the method further includes providing the at least one of the one or more query-completion suggestions such that selection thereof causes searching of the at least one query-completion suggestion against the particular information domain. The method further includes receiving a selection of the at least one of the one or more query-completion suggestions, and providing a plurality of search results determined by searching the at least one of the one or more query-completion suggestions against the particular information domain.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules including routines, programs, objects, components, data structures, and the like, refer to code that performs particular tasks or implements particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by the computing device 100 and includes both volatile and nonvolatile media, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Combinations of any of the above are also included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, and the like.

As previously mentioned, embodiments of the present invention are generally directed to systems, methods, and computer-readable storage media for, among other things, providing query-completion suggestions configured to be searched against vertical information domains in response to receiving a general web search query. At least a portion of a general web search query is received. The query portion may be received, for instance, via a query-input region or search box presented in association with a general web search domain (e.g., www.bing.com, www.google.com, or the like). As the portion of the general web search query is received, query-completion suggestions (that is, suggested complete queries determined based upon the query portion input) are determined as is a likely primary intent associated with at least a portion of the determined query-completion suggestions. Upon determining that the likely primary intent associated with a particular query-completion suggestion is for information associated with a particular vertical information domain other than the general web domain, the query-completion suggestion is provided such that selection thereof causes searching of the query-completion suggestion against the particular information domain for search results. Thus, upon user selection of the particular query completion suggestion, the user is navigated to the particular information domain and search results are provided that are indexed within the particular information domain rather than merely within the general web search domain. In embodiments, the actual presentation of the search results may differ substantially from the presentation of results that would be provided if the query-completion suggestion was searched against the general web domain. For instance, if a query-completion suggestion is searched against an "images" domain, the results may appear as images rather than text. Thus, navigating the user to the particular vertical information domain may provide a significantly richer and more satisfactory user experience.

Figure 2:
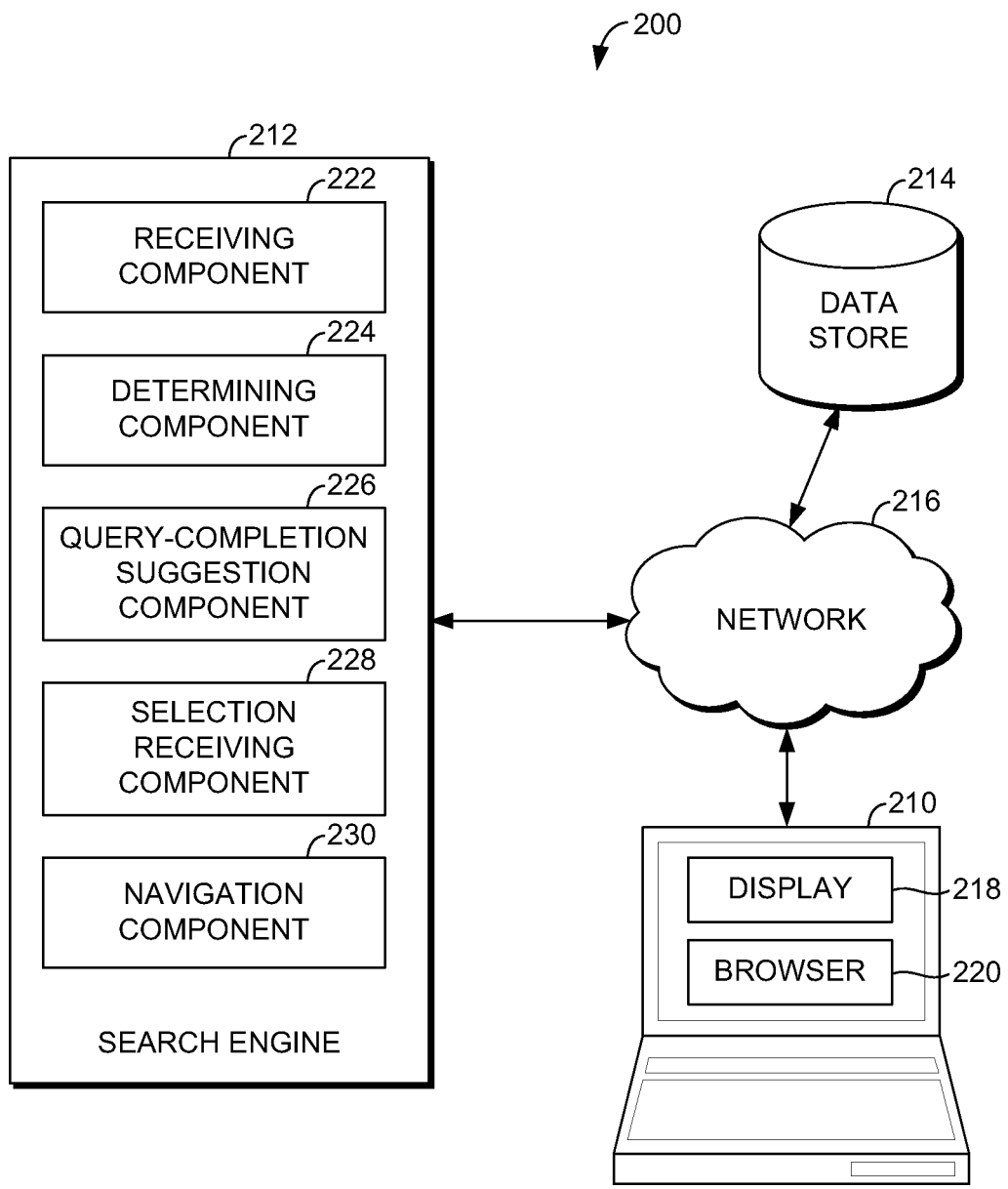
FIG. 2 is a block diagram of an exemplary computing system in which embodiments of the invention may be employed.

Referring now to FIG. 2, a block diagram is provided illustrating an exemplary computing system 200 in which embodiments of the present invention may be employed. Generally, the computing system 200 illustrates an environment in which query-completion suggestions configured to be searched against vertical information domains may be provided. As will be described in further detail below, embodiments of the present invention provide systems and methods for providing query-completion suggestions configured to be searched against vertical information domains in response to receiving a portion of a general web search query. In this way, the system 200 is configured to provide more targeted, richer results to an input query determined to be directed to a particular information vertical than would be provided by searching the query against a general web vertical.

Among other components not shown, the computing system 200 generally includes a client computing device 210, a search engine 212, and a data store 214, all in communication with one another via a network 216. The network 216 may include, without limitation, one or more local area networks (LANs) and/or wide area networks (WANs). Such networking environments are commonplace in offices, enterprise-wide computer networks, intranets and the Internet. Accordingly, the network 216 is not further described herein.

It should be understood that any number of client computing devices, search engines and data stores may be employed in the computing system 200 within the scope of embodiments of the present invention. Each may comprise a single device/interface or multiple devices/interfaces cooperating in a distributed environment. For instance, the search engine 212 may comprise multiple devices and/or modules arranged in a distributed environment that collectively provide the functionality of the search engine 212 described herein. Additionally, other components/modules not shown also may be included within the computing system 200.

In some embodiments, one or more of the illustrated components/modules may be implemented as stand-alone applications. In other embodiments, one or more of the illustrated components/modules may be implemented via the client device 210, as an Internet-based service, or as a module inside the search engine 212. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of search engines or user computing devices. By way of example only, the search engine 212 might be provided as a single server (as shown), a cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The client computing device 210 may include any type of computing device, such as the computing device 100 described with reference to FIG. 1, for example. Generally, the client computing device 210 includes a browser 218 and a display 220. The browser 218 is configured to render web pages, for instance, search engine results pages (SERPs), in association with the display 220 of the client computing device 210. The browser 218 is further configured to receive user input of requests for various web pages (including search engine home pages), receive user inputted search queries (generally input via a user interface presented on the display 220 and permitting alpha-numeric and/or textual input into a designated search input region) and to receive content for presentation on the display 220, for instance, from the search engine 212. The browser 218 may be any suitable type of web browser such as Internet Explorer®, Firefox®, Chrome®, Safari®, or other type of software configured to enable submission of search queries as disclosed herein. It should be noted that the functionality described herein as being performed by the browser 218 may be performed by any other application capable of rendering web content. Any and all such variations, and any combination thereof, are contemplated to be within the scope of embodiments of the present invention.

The display 220 is configured to present various content including, without limitation, SERPs having results indexed within a particular vertical information domain rather than merely within the general web search domain as described herein. In embodiments, the display 220 is further configured to enable touch inputs from a user.

The search engine 212 is configured to receive and respond to requests that it receives from components associated with client computing devices, for instance, the browser 218 associated with the client computing device 210. Those skilled in the art of the present invention will recognize that the present invention may be implemented with any number of searching utilities. For example, an Internet search engine or a database search engine may utilize the present invention. These search engines are well known in the art, and commercially available engines share many similar processes not further described herein.

As illustrated, the search engine 212 includes a query receiving component 222, a determining component 224, a query-completion suggestion component 226, a selection receiving component 228 and a navigation component 230. The query receiving component 222 of the search engine 212 is configured to receive search queries and/or portions thereof, for instance, search queries input via the client computing device 210. An input search query may include, by way of example only, alpha-numeric and/or textual input. In embodiments, the query receiving component 222 receives a search query and/or a portion thereof that has been input in association with a query-input region (e.g., a search box) presented in association with a display (e.g., the display 220 of the client computing device 210).

The query-completion suggestion component 226 is configured to determine one or more query-completion suggestions for the received search query or portion thereof. Query-completion suggestions are suggested complete queries determined based upon query volumes and the like, that are associated with an input query portion. For instance, if a user inputs the query portion "Sean," a query-completion suggestion of "Sean Connery" may be provided. Similarly, if a user inputs the query portion "Nikon d9," a query-completion suggestion of "Nikon d90" may be provided.

The determining component 224 is configured to determine whether a primary intent of at least one query-completion suggestion determined by the query-completion suggestion component is for information associated with a particular information domain other than a general web domain. In embodiments, query log data is mined to determine a primary intent of query-completion suggestion. In other embodiments, query-completion suggestion parsing techniques are utilized to determine a primary intent of a query-completion suggestion. Any and all such variations, and any combination thereof, are contemplated to be within the scope of embodiments of the present invention.

In embodiments, an intent of a query-completion suggestion may be determined by the determining component 224 to be a primary intent if the likelihood that the intent is for information associated with a particular information domain other than a general web domain exceeds a pre-determined threshold value. Such likelihood may be determined utilizing one or more of query log data mining and parsing techniques, as discussed above.

Upon determining that the primary intent of a particular query-completion suggestion is for information indexed within a general web search domain, the query-completion suggestion component 226 is configured to provide the query-completion suggestion such that selection thereof permits searching of the query-completion suggestion against the general web search domain in accordance with typical web search processes. Upon determining, however, that the primary intent of a particular query-completion suggestion is for information indexed in association with a particular vertical information domain other than the general web search domain, the query-completion suggestion component 226 is configured to provide the query-completion suggestion such that selection thereof permits searching of the query-completion suggestion against the particular vertical information domain.

The selection receiving component 228 is configured to receive a selection of query-completion suggestions. To the extent a selected query-completion suggestion is configured such that selection thereof permits searching of the query-completion suggestion against a particular vertical information domain rather than the general web search domain, the navigation component 230 is configured to navigate the user to the particular information domain. Search results then may be provided that are determined by searching the selected query-completion suggestion against the particular vertical information domain rather than the general web search domain.

Figure 3:
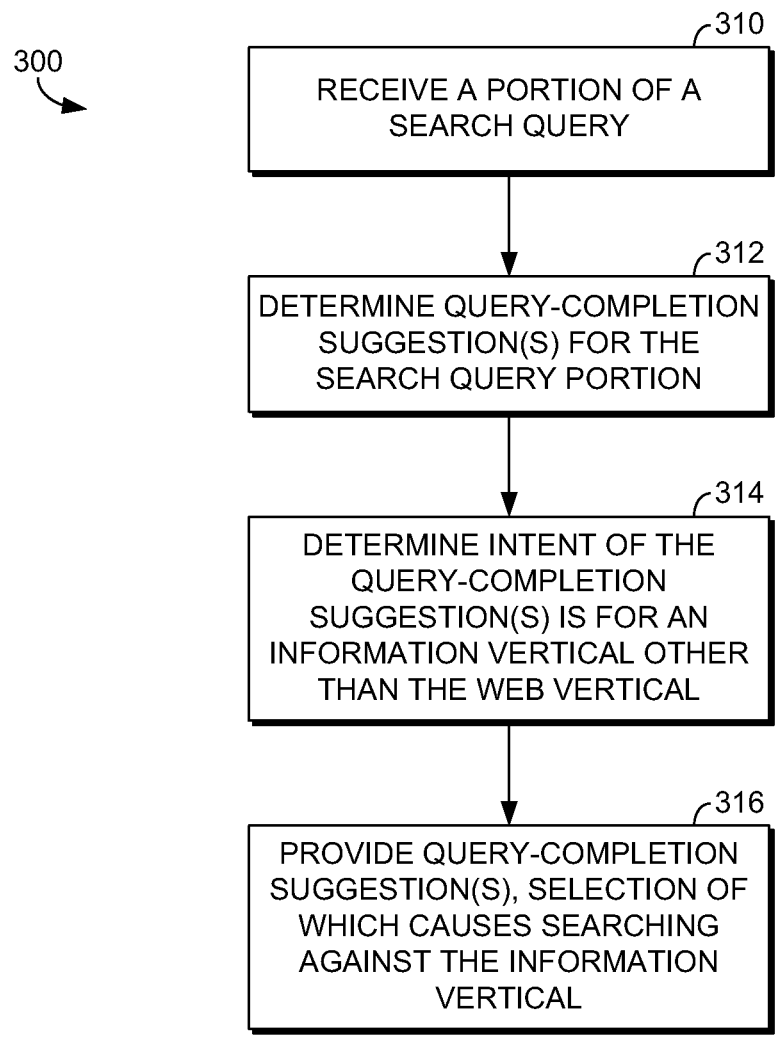
FIG. 3 is a flow diagram showing an exemplary method for providing information-domain-specific query-completion suggestions, in accordance with embodiments of the present invention.

With reference now to FIG. 3, a flow diagram is illustrated showing an exemplary method 300 for providing information-domain-specific query-completion suggestions, in accordance with embodiments of the present invention. Initially, as indicated at block 310, a portion of a search query is received, for instance, by query receiving component 222 of the search engine 212 of FIG. 2. One or more query-completion suggestions are determined for the received search query portion, as indicated at block 312 (for instance, by query-completion suggestion component 226 of FIG. 2). It then is determined that a primary intent of at least one of the determined query-completion suggestions is for information associated with a particular vertical information domain other than a general web domain (e.g., via determining component 224 of FIG. 2). This is indicated at block 314. Any query-completion suggestion(s) for which a primary intent is determined to be for information associated with a particular vertical information domain other than a general web domain are then provided such that selection thereof causes searching of the subject query-completion suggestion against the particular information domain, as indicated at block 316.

Figure 4:
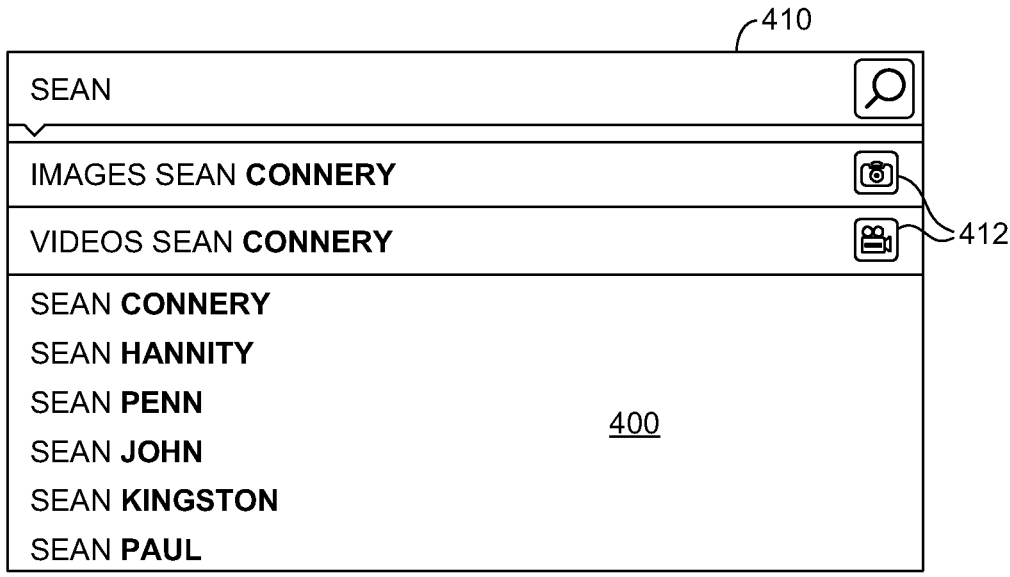
FIG. 4 is a schematic diagram showing an exemplary screen display of query-completion suggestions specific to a particular information domain being presented in association with a query-input region or search box, in accordance with an embodiment of the present invention.

With reference to FIG. 4, a schematic diagram is illustrated showing an exemplary screen display 400 of query-completion suggestions specific to a particular information domain being presented in association with a query-input region or search box 410, in accordance with an embodiment of the present invention. As illustrated, a user has input the query portion "SEAN" into the query-input region or search box 410 associated with a general web search domain (e.g., www.bing.com or www.google.com). A plurality of query-completion suggestions are shown in association with the query-input region including "IMAGES SEAN CONNERY," "VIDEOS SEAN CONNERY," "SEAN CONNERY," "SEAN HANNITY," etc. The query-completion suggestions having the terms "IMAGES" and "VIDEOS" preceding the terms "SEAN CONNERY" are query-completion suggestions for which an intent is information associated with an information domain other than the general web search domain; in this case, an "images" domain and a "videos" domain, respectively. In embodiments, the terms "IMAGES" and "VIDEOS" may be presented in a different font, in a different color, underlined, italicized, or in any other way presented such that they stand out relative to the other terms presented in the query-completion suggestion as an indication to the user that something different is going to happen (e.g., that they are going to be navigated to a particular vertical information domain) upon selection of the particular query-completion suggestion. In the illustrated embodiment, an iconic indicator 412 is also presented as an indication that the presented query-completion suggestion will be searched against information indexed in association with a particular vertical information domain other than the web search domain upon selection. Any and all such variations, and any combination thereof, are contemplated to be within the scope of embodiments of the present invention.

Figure 5:
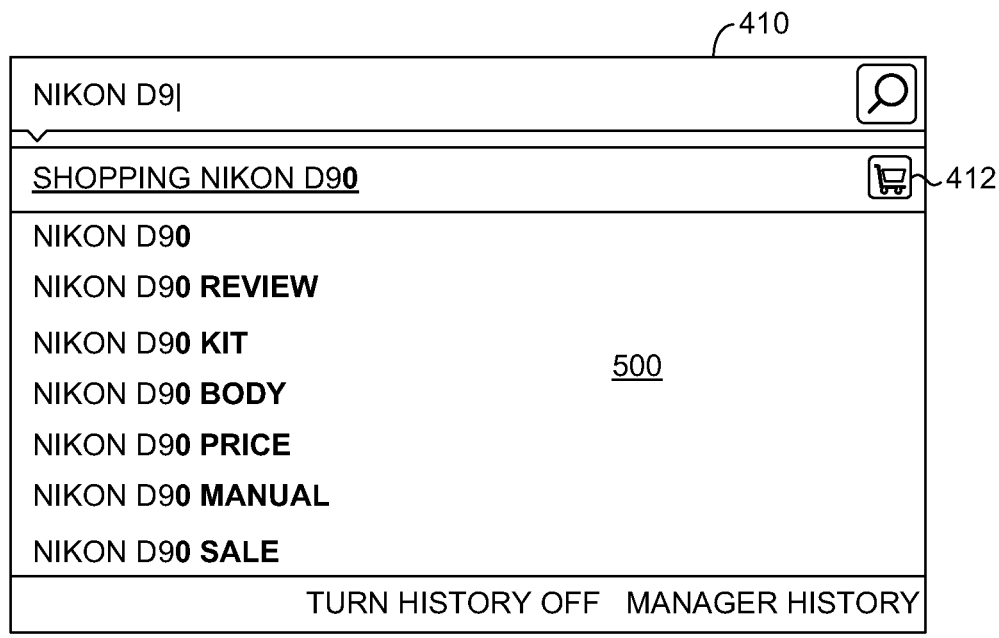
FIG. 5 is a schematic diagram showing another exemplary screen display of query-completion suggestions specific to a particular information domain being presented in association with a query-input region or search box, in accordance with an embodiment of the present invention.

With reference to FIG. 5, a schematic diagram is illustrated showing another exemplary screen display 500 of query-completion suggestions specific to a particular information domain being presented in association with a query-input region or search box 410, in accordance with an embodiment of the present invention. As illustrated, a user has input the query portion "NIKON D9" into the query-input region or search box 410 associated with a general web search domain (e.g., www.bing.com or www.google.com). A plurality of query-completion suggestions are shown in association with the query-input region including "SHOPPING NIKON D90," "NIKON D90," "NIKON D90 REVIEW," etc. The top-listed query-completion suggestion is a query-completion suggestions for which an intent is information associated with an information domain other than the general web search domain; in this case, an "shopping" domain. In embodiments, the term "SHOPPING" may be presented in a different font, in a different color, underlined, italicized, or in any other way presented such that they stand out relative to the other terms presented in the query-completion suggestion as an indication to the user that something different is going to happen (e.g., that they are going to be navigated to a particular vertical information domain) upon selection of the particular query-completion suggestion. In the illustrated embodiment, an iconic indicator 412 is also presented as an indication that the presented query-completion suggestion will be searched against information indexed in association with a particular vertical information domain other than the web search domain upon selection. Any and all such variations, and any combination thereof, are contemplated to be within the scope of embodiments of the present invention.

Figure 6:
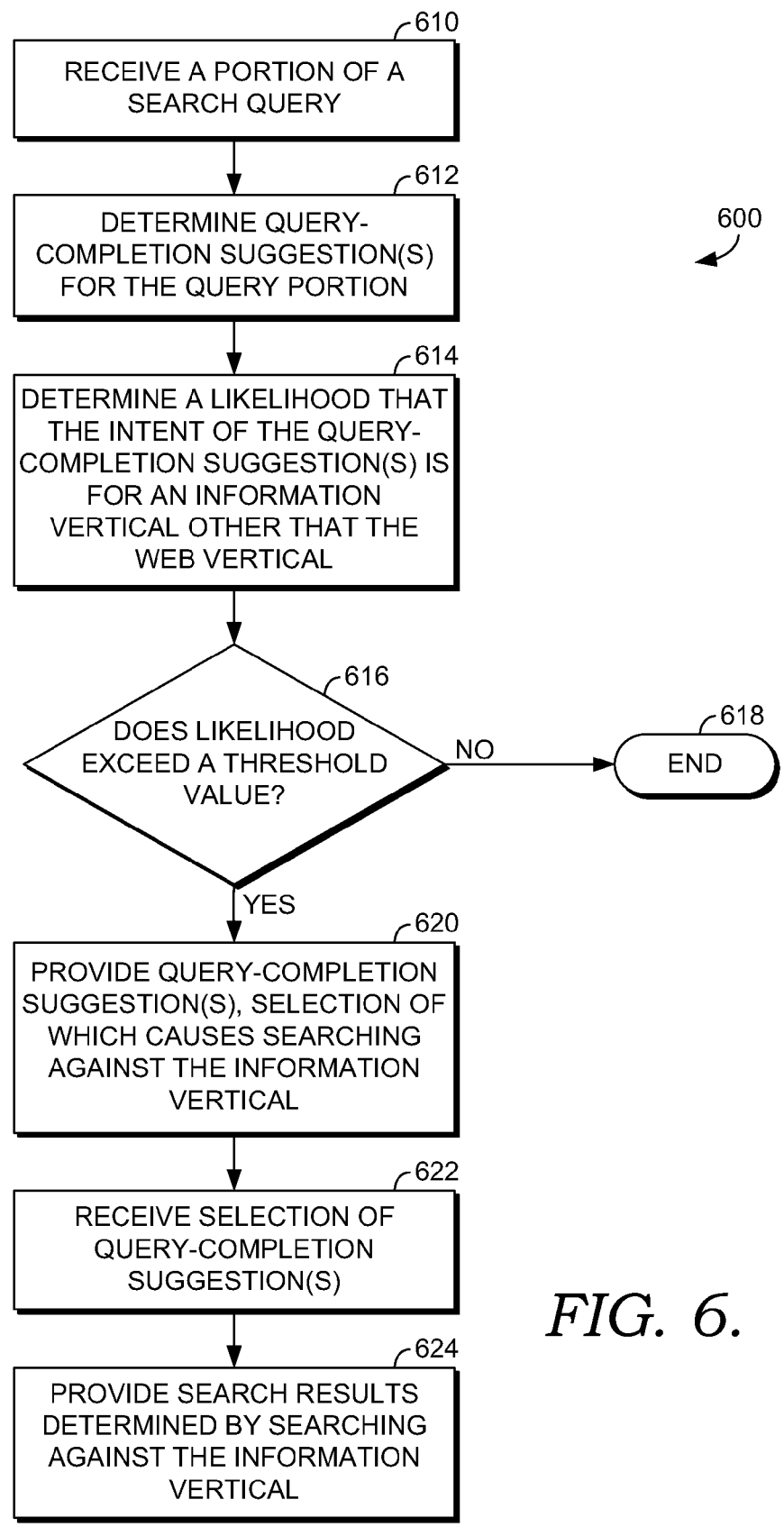
FIG. 6 is a flow diagram showing an exemplary method for providing search results determined against a particular information domain based upon receiving a selection of a query-completion suggestion specific to the particular information domain, in accordance with an embodiment of the present invention.

FIG. 6 is a flow diagram showing an exemplary method 600 for providing search results determined against a particular information domain based upon receiving a selection of a query-completion suggestion specific to the particular information domain, in accordance with an embodiment of the present invention. Initially, as indicated at block 610, a portion of a search query is received, e.g., by query receiving component 222 of the search engine 212 of FIG. 2. One or more query-completion suggestions are then determined for the received query portion (for instance, utilizing query-completion suggestion component 226 of FIG. 2). This is indicated at block 612. As indicated at block 614, a likelihood that an intent of at least one of the query-completion suggestions is for information associated with a particular information vertical or domain other than a general web domain is determined, for instance, utilizing determining component 224 of FIG. 2. It is then determined whether the determined likelihood exceeds a threshold value, as indicated at block 616. If the likelihood does not exceed a threshold value, the query-completion suggestion is presented as per traditional techniques and the method in accordance with embodiments of the present invention ends, as indicated at block 618. If, however, the determined likelihood does exceed a threshold value, the query-completion suggestion(s) for which the likelihood that an intent thereof is for information associated with a particular information domain other than a general web domain is exceeded are provided such that selection thereof causes searching of the subject query-completion suggestion(s) against the particular information domain. This is indicated at block 620.

A selection of a provided query-completion suggestion is then received, e.g., by selection receiving component 228 of FIG. 2, as indicated at block 622. As indicated at block 624, the user entering the query portion is then navigated to the particular information domain (e.g., using navigation component 230 of FIG. 2) and a plurality of search results is provided, the search results being determined by searching the subject query-completion suggestion against the particular information domain.

As can be understood, embodiments of the present invention provide systems and methods for web-scale visual search that are capable of using a combination of visual input modalities. The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the method 300 of FIG. 3 and the method 600 of FIG. 6 are not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. One or more computer storage hardware memory devices storing computer-useable instructions that, when used by one or more computing devices, cause the one or more computing devices to perform a method comprising:
   receiving a portion of a search query;
   determining one or more query-completion suggestions for the portion of the search query;
   determining that an intent of at least one of the one or more query-completion suggestions is for information associated with a particular information domain of a plurality of vertical domains based on a threshold value that indicates whether or not the intent of the at least one of the one or more query-completion suggestions is for information associated with the particular information domain such that when the threshold value is not exceeded, the at least one of the one or more query-completion suggestions in not provided with the particular information domain; and
   wherein upon the determining component determining that the likelihood exceeds the threshold value, providing the one or more query-completion suggestions, wherein the one or more query-completion suggestions includes the at least one of the one or more query completion suggestions as a query-completion suggestion associated with a particular information domain,
   wherein the query-completion suggestion associated with the particular information domain comprises a term associated with the particular information domain preceding one or more terms of the query-completion suggestion,
   wherein the query-completion suggestion associated with the particular information domain is provided as a top-listed query-completion suggestion relative to others, from the one or more query-completion suggestions, that are not associated with particular information domains,
   wherein the query-completion suggestion associated with the particular information domain is provided as a selectable query-completion suggestion such that selection thereof causes searching of the one or more terms against the particular information domain.

2. The devices of claim 1, wherein receiving the portion of the search query comprises receiving the portion of the search query in association with a query-input region and wherein providing the at least one of the one or more query-completion suggestions comprises providing the query-completion suggestion associated with the particular information domain in association with the query-input region.

3. The devices of claim 1, wherein determining the intent of the at least one of the one or more query-completion suggestions comprises mining query log data to determine the intent of the at least one of the one or more query-completion suggestions.

4. The devices of claim 1, wherein determining the intent of the at least one of the one or more query-completion suggestions comprises parsing the at least one of the one or more query-completion suggestions.

5. The devices of claim 1, wherein the method further comprises providing a visual indicator in association with the query-completion suggestion associated with the particular information domain that indicates that selection of the query-completion suggestion associated with the particular information domain will cause searching of the one or more terms of the at least one of the one or more query-completion suggestions against one of the particular information domain.

6. The devices of claim 1, wherein the method further comprises:
   receiving a selection by a user of the query-completion suggestion associated with the particular information domain and
   navigating the user to the particular information domain.

7. A system comprising:
   a processor in communication with computer-storage media;
   a receiving component that receives a portion of a search query;
   a query-completion suggestion component that determines one or more query-completion suggestions for the portion of the search query; and
   a determining component that determines a likelihood that an intent of at least one of the one or more query-completion suggestions is for information associated with a particular information domain of a plurality of vertical domains, and determines whether the likelihood exceeds a threshold value—wherein the threshold value that indicates whether or not the intent of the at least one of the one or more query-completion suggestions is for information associated with the particular information domain;
   wherein upon the determining component determining that the likelihood does not exceed the threshold value, the at least one of the one or more query-completion suggestions is provided without an associated particular information domain;
   wherein upon the determining component determining that the likelihood exceeds the threshold value, the query-completion suggestion component accesses information stored in association with the computer-storage media and provides the at least one of the one or more query-completion suggestions as a query-completion suggestion associated with a particular information domain,
   wherein the query-completion suggestion associated with the particular information domain comprises a term associated with the particular information domain preceding one or more terms of the query-completion suggestion;
   wherein the query-completion suggestion associated with the particular information domain is provided as a top-listed query-completion suggestion relative to others, from the one or more query-completion suggestions, that are not associated with particular information domains,
   wherein the query-completion suggestion associated with the particular information domain is provided as a selectable query-completion suggestion such that selection thereof causes searching of the one or more terms against the particular information domain.

8. The system of claim 7, wherein the receiving component receives the portion of the search query in association with a query-input region, and wherein the query-completion suggestion component provides the query-completion suggestion associated with the particular information domain in association with the query-input region.

9. The system of claim 7, wherein the determining component mines query log data to determine the likelihood that the intent of the at least one of the one or more query-completion suggestions is for information associated with the particular information domain.

10. The system of claim 7, wherein the determining component parses the at least one of the one or more query-completion suggestions to determine the likelihood that the intent of the at least one of the one or more query-completion suggestions is for information associated with the particular information domain.

11. The system of claim 7, wherein the query-completion suggestion component further provides providing a visual indicator in association with the query-completion suggestion associated with the particular information domain that indicates that selection of the query-completion suggestion associated with the particular information domain will cause searching of the one or more terms of the at least one of the one or more query-completion suggestions against one of the particular information domain.

12. The system of claim 7, further comprising:
a selection receiving component that receives selection by a user of the query-completion suggestion associated with the particular information domain; and
a navigation component that navigates the user to the particular information domain.

13. A method performed by a computing device having a processor, the method comprising:
receiving a portion of a search query;
determining one or more query-completion suggestions for the portion of the search query;
determining a likelihood that an intent of at least one of the one or more query-completion suggestions is for information associated with a particular information domain of a plurality of vertical domains;
determining that the determined likelihood exceeds a threshold value, wherein the threshold value that indicates whether or not the intent of the at least one of the one or more query-completion suggestions is for information associated with the particular information domain such that when the threshold value is not exceeded, the at least one of the one or more query-completion suggestions in not provided with the particular information domain;
upon determining that the determined likelihood exceeds the threshold value, providing the one or more query-completion, wherein the one or more query-completion suggestions include a query-completion suggestion associated with a particular information domain,
wherein the query-completion suggestion associated with the particular information domain comprises a term associated with the particular information domain preceding one or more terms of the query-completion suggestion,
wherein the query-completion suggestion associated with the particular information domain is provided as a top-listed query-completion suggestion relative to others, from the one or more query-completion suggestions, that are not associated with particular information domains,
wherein the query-completion suggestion associated with the particular information domain is provided as a selectable query-completion suggestion such that selection thereof causes searching of the one or more terms against the particular information domain;
receiving a selection of the query-completion suggestion associated with the particular information domain; and
providing a plurality of search results determined by searching the query-completion suggestion associated with the particular information domain.

14. The method of claim 13, wherein receiving the portion of the search query comprises receiving the portion of the search query in association with a query-input region and wherein providing the at least one of the one or more query-completion suggestions comprises providing the query-completion suggestion associated with the particular information domain in association with the query-input region.

15. The method of claim 13, wherein determining the likelihood that the intent of the at least one of the one or more query-completion suggestions comprises mining query log data to determine the intent of the at least one of the one or more query-completion suggestions.

16. The method of claim 13, wherein determining the likelihood that the intent of the at least one of the one or more query-completion suggestions is for information associated with the particular information domain comprises parsing the at least one of the one or more query-completion suggestions.

17. The method of claim 13, further comprising wherein the method further comprises providing a visual indicator in association with the query-completion suggestion associated with the particular information domain that indicates that selection of the query-completion suggestion associated with the particular information domain will cause searching of the one or more terms of the at least one of the one or more query-completion suggestions against one of the particular information domain.

* * * * *